United States Patent
Pi et al.

(10) Patent No.: US 10,074,002 B2
(45) Date of Patent: Sep. 11, 2018

(54) ACTIVE BASELINE SIGNAL CANCELLATION IN FINGERPRINT SENSORS

(71) Applicant: Shenzhen Goodix Technology Co., Ltd., Shenzhen (CN)

(72) Inventors: Bo Pi, Carlsbad, CA (US); Mengta Yang, Taipei (TW)

(73) Assignee: Shenzhen Goodix Technology Co., Ltd., Shenzhen (CN)

( * ) Notice: Subject to any disclaimer, the term of this patent is extended or adjusted under 35 U.S.C. 154(b) by 48 days.

(21) Appl. No.: 15/344,506

(22) Filed: Nov. 4, 2016

(65) Prior Publication Data

US 2017/0068837 A1    Mar. 9, 2017

Related U.S. Application Data

(63) Continuation of application No. PCT/CN2015/091491, filed on Oct. 8, 2015.

(60) Provisional application No. 62/061,661, filed on Oct. 8, 2014.

(51) Int. Cl.
G06K 9/00    (2006.01)

(52) U.S. Cl.
CPC ....... G06K 9/00013 (2013.01); G06K 9/0002 (2013.01)

(58) Field of Classification Search
CPC .................. G06K 9/00013; G06K 9/0002
See application file for complete search history.

(56) References Cited

U.S. PATENT DOCUMENTS

| | | | |
|---|---|---|---|
| 6,333,989 B1 | 12/2001 | Borza | |
| 2006/0049834 A1† | 3/2006 | Umeda | |
| 2009/0123039 A1 | 5/2009 | Gozzini | |
| 2012/0085822 A1† | 4/2012 | Setlak | |
| 2014/0262848 A1* | 9/2014 | Fathollahi | A45C 11/00 206/37 |

FOREIGN PATENT DOCUMENTS

| | | |
|---|---|---|
| CN | 104020914 A | 9/2014 |
| CN | 104217193 A | 12/2014 |
| CN | 104268530 A | 1/2015 |

OTHER PUBLICATIONS

International Search Report and Written Opinion for International Application No. PCT/CN2015/091491, Applicant: Shenzhen Huiding Technology Co., Ltd., Jan. 4, 2016, 9 pages.

\* cited by examiner
† cited by third party

*Primary Examiner* — Qian Yang

(57) ABSTRACT

In one aspect, a fingerprint sensor chip includes an array of senor pixels. At least one of the sensor pixels is designated as a reference sensor pixel and remaining sensor pixels in the array are designated to contribute to fingerprint data, The sensor chip includes a signal processing unit including amplifier circuitry to cancel out baseline signals from output signals of remaining sensor pixels based at least on an output signal of the reference sensor pixel.

20 Claims, 6 Drawing Sheets

ACTIVE BASELINE SIGNAL CANCELLATION IN FINGERPRINT SENSORS

CROSS REFERENCE TO RELATED APPLICATIONS

The present application is a continuation application of PCT Application No. PCT/CN2015/091491 filed on Oct. 8, 2015, which claims the benefit of priority of U.S. Provisional Patent Application No. 62/061,661, filed Oct. 8, 2014. The entire contents of the before-mentioned both patent applications are incorporated by reference as part of the disclosure of this document.

TECHNICAL FIELD

This patent document generally relates to signal processing in fingerprint sensors.

BACKGROUND

Electronic devices including portable or mobile computing devices, such as laptops, tablets, smartphones, and gaming systems can employ user authentication mechanisms to protect personal data and prevent unauthorized access. User authentication on an electronic device can be carried out through one or multiple forms of biometric identifiers, which can be used alone or in addition to conventional password authentication methods. A popular form of biometric identifiers is a person's fingerprint pattern. A fingerprint sensor can be built into the electronic device to read a user's fingerprint pattern so that the device can only be unlocked by an authorized user of the device through authentication of the authorized user's fingerprint pattern.

SUMMARY

This patent document describes technology for providing devices, systems, and techniques to perform active baseline signal cancellation in fingerprint sensors. Human fingerprint detection can be used to authenticate an access attempt to a locked device including a mobile device equipped with a fingerprint detection device. The fingerprint detection device described in this patent document incorporates active baseline signal cancellation to enable the use of the full dynamic range of a signal processing unit including amplifiers and analog to digital converters (ADCs) to measure or detect the ridge and valley signals associated with a human finger print. The active baseline signal cancellation takes into account the differences in the baseline signal between different fingerprints of different users due to the uniqueness of the pattern of ridges and valleys for a particular fingerprint.

In one aspect, a fingerprint sensor chip includes an array of senor pixels. At least one of the sensor pixels is designated as a reference sensor pixel and remaining sensor pixels in the array are designated to contribute to fingerprint data, The sensor chip includes a signal processing unit including amplifier circuitry to cancel out baseline signals from output signals of remaining sensor pixels based at least on an output signal of the reference sensor pixel.

The fingerprint senor can be implemented in various ways to include one or more of the following features. The amplifier circuitry can cancel out the baseline signals by subtracting the output signal of the reference sensor pixel from the output signals corresponding to the remaining sensor signals.

In another aspect, a method of cancelling a baseline signal in a fingerprint sensor chip is described. The method includes responsive to an input indicating a fingerprint scan, generating at an array of fingerprint sensor pixels, output signals including baseline signals and fingerprint signals. The baseline signals are greater than fingerprint signals. Selecting one of the fingerprint sensor pixels as a reference fingerprint sensor pixel. Using the output signal corresponding to the selected reference fingerprint sensor pixel to cancel the baseline signals from remaining output signals corresponding to remaining sensor pixels. Amplifying the baseline signal cancelled output signals corresponding to the remaining sensor pixels. The method includes using the amplified signals to generate fingerprint data.

In another aspect, a method of cancelling a baseline signal in a fingerprint sensor chip is described. Responsive to an input indicating a fingerprint scan, generating at an array of fingerprint sensor pixels, output signals including baseline signals and fingerprint signals. The baseline signals are greater than fingerprint signals. The output signals are compared against a preset reference signal. When the preset reference signal is within a threshold percentage of the output signals, cancelling out the baseline signals by performing the following: using the preset reference signal to cancel out the baseline signals from the array of sensor pixels; amplifying the baseline signal cancelled output signals corresponding to the remaining sensor pixels; and using the amplified signals to generate fingerprint data.

In another aspect, a fingerprint sensor chip includes an array of senor pixels. At least one of the sensor pixels is designated as a reference sensor pixel and remaining sensor pixels in the array are designated to contribute to fingerprint data. The fingerprint sensor chip includes a signal processing unit including circuitry to cancel out baseline signals from output signals of remaining sensor pixels based at least on an output signal of the reference sensor pixel.

The fingerprint sensor chip can be implemented in various ways to include one or more of the following features. For example, the circuitry to cancel out baseline signals can cancel out the output signal of the reference sensor pixel from the output signals corresponding to the remaining sensor signals. The signal processing unit can include an integrating amplifier for each of the remaining sensor pixels configured to amplify the baseline signal cancelled output signal of a corresponding remaining sensor pixel. The signal processing unit can include a reference coupling capacitor for each of the remaining sensor pixels disposed on an electrical path to receive the output signal of the reference sensor pixel. The signal processing unit can include a sensor coupling capacitor for each of the remaining sensor pixels disposed on an electrical path to receive the output signal of a corresponding sensor pixel. The reference sensor pixel can be positioned substantially near a center of the array of sensor pixels. More than one of the sensor pixels can be designated as reference sensor pixels.

In another aspect, a method of cancelling a baseline signal in a fingerprint sensor chip includes responsive to an input indicating a fingerprint scan, generating at an array of fingerprint sensor pixels. The output signals include baseline signals and fingerprint signals, and the baseline signals are greater than fingerprint signals. The method includes selecting one of the fingerprint sensor pixels as a reference fingerprint sensor pixel; using the output signal corresponding to the selected reference fingerprint sensor pixel to cancel the baseline signals from remaining output signals corresponding to remaining sensor pixels; amplifying the baseline signal cancelled output signals corresponding to the remaining sensor pixels; and using the amplified signals to generate fingerprint data.

The method can be implemented in various ways to include one or more of the following features. For example, the method can include selecting additional ones of the sensor pixels as reference sensor pixel; and using the output signals corresponding to the selected reference sensor pixels to cancel the baseline signals from the output signals of the remaining sensor pixels. Using the output signals corresponding to the selected reference sensor pixels to cancel the baseline signals from the output signals of the remaining sensor pixels can include averaging the output signals corresponding to the selected reference sensor pixels. The averaged output signal can be used to cancel the baseline signals from the output signals of the remaining sensor pixels.

In another aspect, a method of cancelling a baseline signal in a fingerprint sensor chip includes responsive to an input indicating a fingerprint scan, generating at an array of fingerprint sensor pixels. The output signals include baseline signals and fingerprint signals, and the baseline signals are greater than fingerprint signals. The method includes comparing the output signals against a preset reference signal. When the preset reference signal satisfy a threshold percentage of the output signals, the baseline signals is cancelled out from the output signals by performing the following: using the preset reference signal to cancel out the baseline signals from the output signals generated at the array of sensor pixels; amplifying the baseline signal cancelled output signals corresponding to the array of sensor pixels; and using the amplified signals to generate fingerprint data.

The method can be implemented in various ways to include one or more of the following features. For example, using the amplified signals to generate the fingerprint data can include reading out the amplified signals from the array of sensor pixels each row or column of the array of sensor pixels at a time. When the preset reference signal does not satisfy the threshold percentage of the output signals, the preset reference signal can be adjusted and compared against the output signals of the sensor pixels to determine whether the adjusted reference signal satisfies the threshold percentage. When the adjusted reference signal satisfies the threshold percentage of the output signals, the baseline signals can be cancelled out from the output signals by performing the following: using the adjusted reference signal to cancel out the baseline signals from the output signals generated at the array of sensor pixels; amplifying the baseline signal cancelled output signals corresponding to the array of sensor pixels; and using the amplified signals to generate fingerprint data. The method can include incrementally adjusting the adjusted reference signal until the threshold percentage is satisfied.

In yet another aspect, a mobile device includes a fingerprint sensor device and a protective cover disposed over the fingerprint sensor device. The protective cover includes a dielectric material. The fingerprint sensor device includes a sensor chip, and the sensor chip includes an array of senor pixels. One of the sensor pixels is designated as a reference sensor pixel and remaining sensor pixels in the array are designated to contribute to fingerprint data. The sensor chip includes a signal processing unit including circuitry configured to cancel out baseline signals from output signals of remaining sensor pixels based at least on an output signal of the reference sensor pixel.

The mobile device can be implemented in various ways to include one or more of the following features. For example, the circuitry to cancel out baseline signals can cancel out the output signal of the reference sensor pixel from the output signals corresponding to the remaining sensor signals. The signal processing unit can include an integrating amplifier for each of the remaining sensor pixels configured to amplify the baseline signal cancelled output signal of a corresponding remaining sensor pixel. The signal processing unit can include a reference coupling capacitor for each of the remaining sensor pixels disposed on an electrical path to receive the output signal of the reference sensor pixel. The signal processing unit can include a sensor coupling capacitor for each of the remaining sensor pixels disposed on an electrical path to receive the output signal of a corresponding sensor pixel. The reference sensor pixel can be positioned substantially near a center of the array of sensor pixels. More than one of the sensor pixels can be designated as reference sensor pixels.

DETAILED DESCRIPTION

Fingerprint sensor signals tend to include large baseline signals with the actual ridge and valley signals that contribute to fingerprint data can be less than 10% of the total signal. Embodiments described in this patent document provide devices, systems, and techniques that implement active baseline signal cancellation in fingerprint sensors. The disclosed techniques for active baseline signal cancellation can enable the use of the full dynamic range of a signal processing unit including amplifiers and analog to digital converters (ADCs) to measure or detect the ridge and valley signals associated with a human finger print. The active baseline signal cancellation takes into account the differences in the baseline signal between different fingerprints of different users due to the uniqueness of the pattern of ridges and valleys for a particular fingerprint.

Figure 1A:
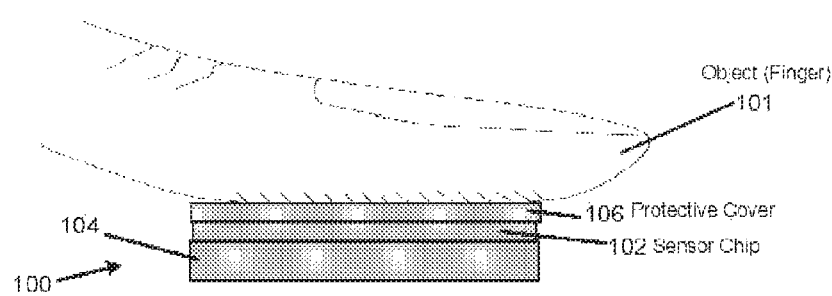
FIG. 1A is a block diagram showing an exemplary fingerprint sensor device structure implementing active baseline signal cancellation.

FIG. 1A is a block diagram showing an exemplary fingerprint sensor device 100 implementing active baseline signal cancellation. The fingerprint sensor device 100 includes a sensor chip 102 disposed over a substrate carrier 104 and a protective film or cover layer 106 disposed over the sensor chip 102. The protective film or cover layer 106 can include an insulator or dielectric material such as glass, silicon dioxide ($SiO_2$), sapphire, plastic, polymer, and other substantially similar materials. The protective film or cover layer 106 can be present to protect the sensor chip 102 and potentially function as a part of a dielectric layer between a surface of a finger 101 and conductive sensing electrodes of individual sensor pixels in the sensor chip 102. The protective film or cover layer 106 is an optional layer depending on the application of the fingerprint sensor device 100. The fingerprint sensor device 100 can be disposed through an opening of a top cover glass of an electronic device such as a mobile phone or under a top cover glass of the electronic device. When used in the under-the-glass application, the protective film or cover 106 is not needed because the top cover glass of the electronic device will function to protect the sensor chip 102 and act as the dielectric layer. The sensor chip 102 includes an array of sensor pixels that in combination senses or captures fingerprint data from the finger 101 in contact with the protective film or cover layer 106. Each sensor pixel of the sensor chip 102 generates an output signal (e.g., a voltage) based on a capacitance of a capacitor associated with a ridge or valley of the finger 101. The output signals when combined represent a fingerprint image of the finger 101. Higher the number of pixel sensors, greater the resolution of the fingerprint image.

The sensor chip 102 can include a pixelated sensor array 110 which can occupy a significant portion of the sensor chip 102. Each sensor pixel in the pixelated sensing element array 110 can include a CMOS capacitive sensor or other types of sensors that can sense fingerprint features. The sensor chip 102 can include a signal processing unit 112 for processing signals received from all of the sensor pixels in the pixelated sensor array 110, and a connection unit 114 electrically coupled to the signal processing unit 112. The signal processing unit 112 can include various signal processing components including amplifiers, filters, and an analog to digital converter (ADC). The connection unit 114 can include multiple electrodes which can be connected to external circuitry through wire-bonding, bump bonding or other connection means. The connection unit 114 can be disposed along an edge of the sensor chip 102 for the convenience of interfacing with other components of the fingerprint sensor device 100.

The array 110 of sensor pixels in the sensor chip 102 can be arranged to have various shapes and sizes. For example, the array 110 of sensor pixels can be arranged to have a rectangular shape with a width of the rectangular shape being larger than a height of the rectangular shape. Exemplary sizes for the rectangular shaped sensor chip can include 24×88, 32×88, 56×88 sensor pixels. In some implementations, the array 110 of sensor pixels in the sensor chip 102 can be arranged to have a square shape. Exemplary sizes for the square shaped sensor chip 102 include 32×32, 64×64, 96×96 and 128×128 sensor pixels.

Figure 1B:
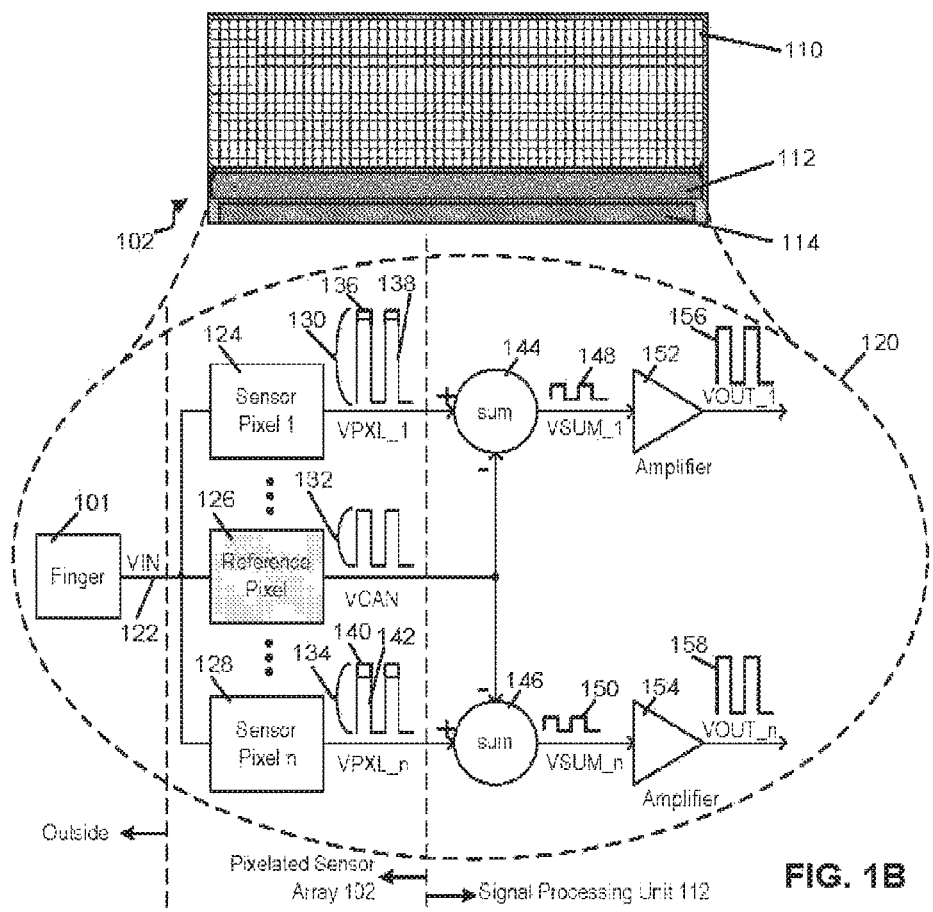
FIG. 1B is a diagram showing an exemplary sensor chip pixel implementing active baseline signal cancellation.

Majority of the output signal of each sensor pixel of the sensor chip can be attributed to a baseline signal unrelated to the ridge and valley signals that contribute to fingerprint data. For example, less than 10% of the total output signal may be attributed to the ridge and valley signals. FIG. 1B shows an exemplary sensor chip 102 with a circuit equivalent 120 of the pixelated sensor array 102 and the signal processing unit 112 that in combination perform active baseline signal cancellation according to the technology disclosed in this patent document.

One of the sensor pixels in the array 110 is designated as a reference sensor pixel 126, which includes the same fingerprint sensor components including a signal amplifier as the remaining sensor pixels 124, 128, and etc. While more than one sensor pixel in the array 110 can be selected and used to generate the baseline cancellation signal (e.g., by averaging the output signal from multiple reference sensor pixels), each sensor pixel used as a reference sensor pixel reduces the resolution of the array 110. Thus, the total number of reference sensor pixel chosen can be balanced with the reduction of sensor pixels used to generate the fingerprint data.

The reference sensor pixel 126 can be selected from near the center of the sensor pixel array 110. The sensor pixel selected as the reference sensor pixel 126 should be in direct contact with the finger 101 to ensure that the output signal VCAN 132 from the reference sensor pixel 126 is based at least partly on a capacitance of the finger 101 for a particular user. Selecting a sensor pixel from near the center of the sensor pixel array 110 can ensure the selected sensor pixel is in direct contact with the finger 101.

When the finger 101 is in contact with the fingerprint sensor 100, an input signal Vin 122 associated with ridges and valleys of the finger 101 is sensed or detected by the sensor pixels of the array 110 including the reference sensor pixel 126. The reference sensor pixel 126 is used to generate a baseline cancelling signal Vcan 132, which is distributed to feed an array of integrators 152, 154, and etc. connected to readout row or column of sensor pixels in the array 110. The baseline signal for all sensor pixels in the array 110 is reset to the reference pixel output signal 132 level.

As shown in FIG. 1B, the output signals for all sensor pixels are dominated by the baseline signal with the ridge and valley signals contributing a small percentage of the total signal. For example, the output signal 130 VPXL_1 includes a baseline signal 138 and a ridge/valley signal 136. Similarly, the output signal 134 VPXL_n for the $n^{th}$ sensor pixel 128 includes a baseline signal 142 and a ridge/valley signal 140. In all sensor pixels, the base line signal (e.g., 142 and 138) is significantly larger than the ridge/valley signal (e.g., 140, 136). Accurate cancellation of the baseline signals from the output signals 130 and 134 of the sensor pixels can enable the use of the full dynamic range of the signal processing unit 112 including amplifiers and analog to digital converters (ADCs) to measure or detect the ridge and valley signals associated with a human finger print.

As shown in FIG. 1B, all sensor pixels in the array 110 including the reference sensor pixel 126 receive the same fingerprint signal VIN 122. In reality the fingerprint signal VIN associated with the finger 101 will vary slightly based on the ridges and valleys that are in contact with specific sensor pixel. However, because the baseline signal dominates the total output signal for all sensor pixels as described above, the baseline signal in the baseline cancellation signal 132 VCAN is essentially the same as the baseline signal in the sensor pixel output signals 130 VPXL_1 and 134 VPXL_n. Due to the commonality in the baseline signal, the baselines cancellation signal 132 VCAN and sensor pixel output signals 130 VPXL_1 and 134 VPXL n will change based on the changes in the finger input signal 122 Vin.

The baseline cancellation signal 132 is subtracted from all sensor pixel output signals 130 VPXL_1 and 134 VPXL n to cancel the common baseline signal. While FIG. 1B shows summing circuitry 144 and 146 as the examples of circuitry for cancelling the common baseline signal in each sensor pixel, other similarly functioning circuitry including voltage adder, and voltage subtractor can be implemented.

In the example shown in FIG. 1B, the baseline cancellation signal 132 represents the reference sensor pixel 126 sensing or detecting a fingerprint valley signal (i.e., the non-baseline signal is close to zero). Using the baseline cancellation signal 132 including the fingerprint valley signal to cancel the baseline signal 138 from the output signal 130 of the sensor pixel 124 can be represented by equation 1 as shown below.

$$VSUM\_1 = VPXL\_1 - VCAN \quad \text{(Equation 1)}.$$

In equation 1, Vsum_1 represents the resultant signal after the baseline cancellation and includes the fingerprint ridge/valley signal 148, which is substantially similar to the ridge/valley signal portion 136 of the total sensor pixel output signal 130. There may be a small insignificant difference between signals 148 and 136 depending at least partly on the magnitude of any ridge/valley signal present in the baseline cancellation signal 132 VCAN. Regardless, the baseline cancellation signal 132 VCAN is a consistent reference signal that is applied to all sensor pixels in the same manner, and any changes (e.g., due to different finger placement on the fingerprint sensor device) to the fingerprint input signal 122 VIN will be distributed equally to all sensor pixels. In addition, because the baseline signal will vary for different fingers due to the uniqueness of individual ridge/valley patterns, the correct finger specific (i.e., user specific) baseline cancellation signal can be applied to cancel the correct finger specific baseline signal for different users' fingers. Moreover, any changes in the finger input signal 122 VIN during different fingerprint scanning, even for the same user, can be accounted for during the baseline cancellation process. Similarly, equation 1 can be used to obtain the baseline cancelled signal 150 VSUM n for sensor pixel 128.

The resultant sensor pixel output 156 VOUT_1 for sensor pixel 1 after baseline signal cancellation and amplification by the integrator 152 can be represented by equation 2 as shown below.

$$VOUT\_1 = A2*VSUM\_1 = A2*(VPXL\_1-VCAN)$$
$$= A2*A*1*k*(VIN-s*VIN) \quad \text{(Equation 2)}.$$

In equation 2, 'A2' represents amplifier gain for the integrator 152, 'A1' represents amplifier gain of the sensor pixel 124, 'k' represents fingerprint ridge/valley change, and 's' represents percentage of baseline signal in the total output signal 130 VPXL_1. Assume integrator amplifier gain A2=10, sensor pixel gain A1=5, fingerprint ridge/valley change k=1.01, signal on finger VIN=1V, and baseline signal s=0.99 (useful signal is only 1%). Based on these exemplary assumptions, the resultant sensor pixel output 156 VOUT_1=0.505 V. The resultant sensor pixel output 156 VOUT_1 is all useful signal with substantially all of the baseline signal that made up 99% of the sensor pixel output signal VPXL_1 canceled. Similar baseline cancellation can be performed for all sensor pixels. For example, the resultant sensor pixel output 158 VOUT_n for sensor pixel 128 after baseline signal cancellation and amplification by the integrator 154 can be represented by equation 2 as described with respect to signal 156.

Figure 2A:
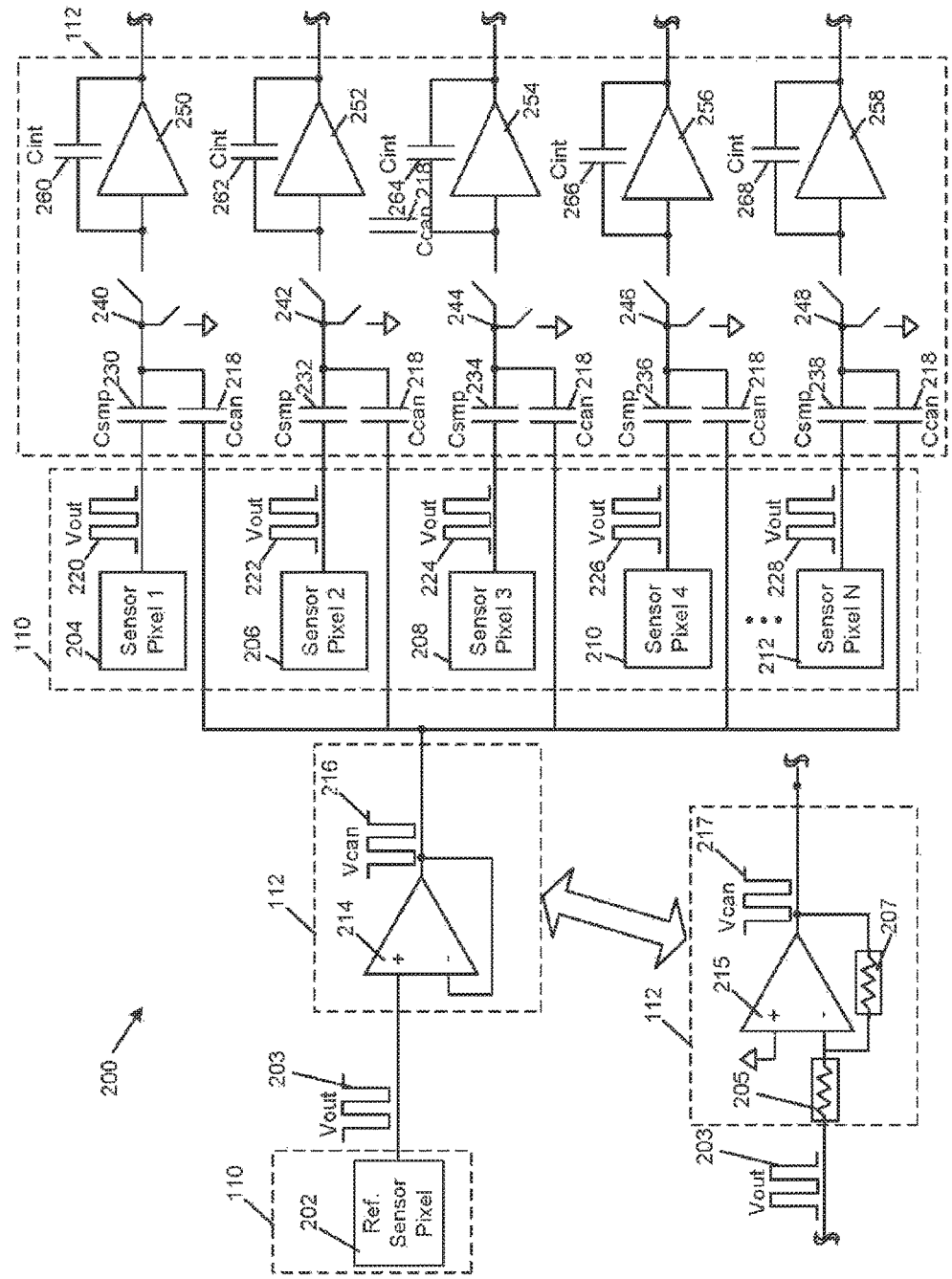
FIG. 2A is a schematic diagram showing a circuit equivalent of an exemplary sensor chip implementing active baseline signal cancellation.

FIG. 2A is a schematic diagram showing a circuit equivalent of an exemplary sensor chip 200 implementing active baseline signal cancellation. The sensor chip 200 can be implemented to be substantially similar to the sensor chip 102 of FIGS. 1A and 1B. In FIG. 2A, an exemplary circuit equivalent is shown to illustrate one implementation of active baseline signal cancellation. The sensor chip 200 includes an array 110 of sensor pixels similar to sensor chip 102. The array 110 includes a number of sensor pixels 204, 206, 208, 210 and 212 including one designated as a reference sensor pixel 202. The components of the sensor pixels 204, 206, 208, 210 and 212 including the reference sensor pixel 202 are not shown in FIG. 2A because the baseline cancellation technology as described in this patent document is independent of the type of sensor pixel (i.e., sensor pixel agnostic). Examples of the type of sensor pixel used in the sensor array 110 can include mutual-capacitance, self-capacitance, optical sensing, inductive coupling, and other types of sensor pixel technologies for detecting fingerprints.

The sensor pixels 204, 206, 208, 210 and 212 can generate corresponding output signals 220, 222, 224, 226, and 228 responsive to a finger input (e.g., when a finger touches or contacts the fingerprint sensor device). Similarly, the reference sensor pixel 202 can generate a corresponding output signal 203 responsive to the same finger input. The output signals 220, 222, 224, 226, and 228 from the sensor pixels and the output signal 203 from the reference sensor pixel are processed by the signal processing unit 112 to perform baseline signal cancellation as follows.

The output signal 203 from the reference sensor pixel 202 is processed by various amplifier circuitry including a voltage follower amplifier 214 or an inverting amplifier 215 to generate a baseline cancellation signal VCAN 216 or 217, which is distributed to all sensor pixels 204, 206, 208, 210 and 212. The gain of the amplifiers 214 and 215 can be controlled by controlling the loads on the appropriate input terminals of the amplifiers 216 and 217 (e.g., resistive loads 205 and 207). Along the signal path of the baseline cancellation signal VCAN 216 or 217, a load 218 (e.g., a coupling capacitor Ccan) is disposed for each sensor pixel. Similarly, along the signal path of each of the sensor pixels 204, 206, 208, 210 and 212, corresponding loads 230, 232, 234, 236, and 238 (e.g., capacitive loads, such as coupling capacitors Csmp) are disposed. When the non-inverting voltage follower amplifier 214 is used, a non-inverted baseline cancellation signal 216 VCAN is generated. The non-inverted baseline cancellation signal VCAN 216 potential over the respective coupling capacitor 218 for the corresponding sensor pixel is subtracted from individual output signal 220, 222, 224, 226, and 228 potentials over the corresponding capacitive loads 230, 232, 234, 236, and 238 to cancel out the baseline signal. When the inverting amplifier 215 is used, an inverted baseline cancellation signal 217 VCAN is generated. The inverted baseline cancellation signal VCAN 217 potential over the respective coupling capacitor 218 corresponding to each sensor pixel is added to individual output signal 220, 222, 224, 226, and 228 potentials over the corresponding capacitive loads 230, 232, 234, 236, and 238 to cancel out the baseline signal.

The baseline signal cancelled signals for the individual sensor pixels 204, 206, 208, 210 and 212 are amplified using corresponding integrating amplifiers 250, 252, 254, 256 and 258. The gain of the integrator can be controlled by controlling the corresponding feedback capacitors 260, 262, 264, 266 and 268. In addition, the integrating amplifiers 250, 252, 254, 256 and 258 are electrically connected to corresponding switch networks 240, 242, 244, 246 and 248 to control operation of the integrating amplifiers 250, 252, 254, 256 and 258 to read out the rows or columns of sensor pixel data.

Figure 2B:
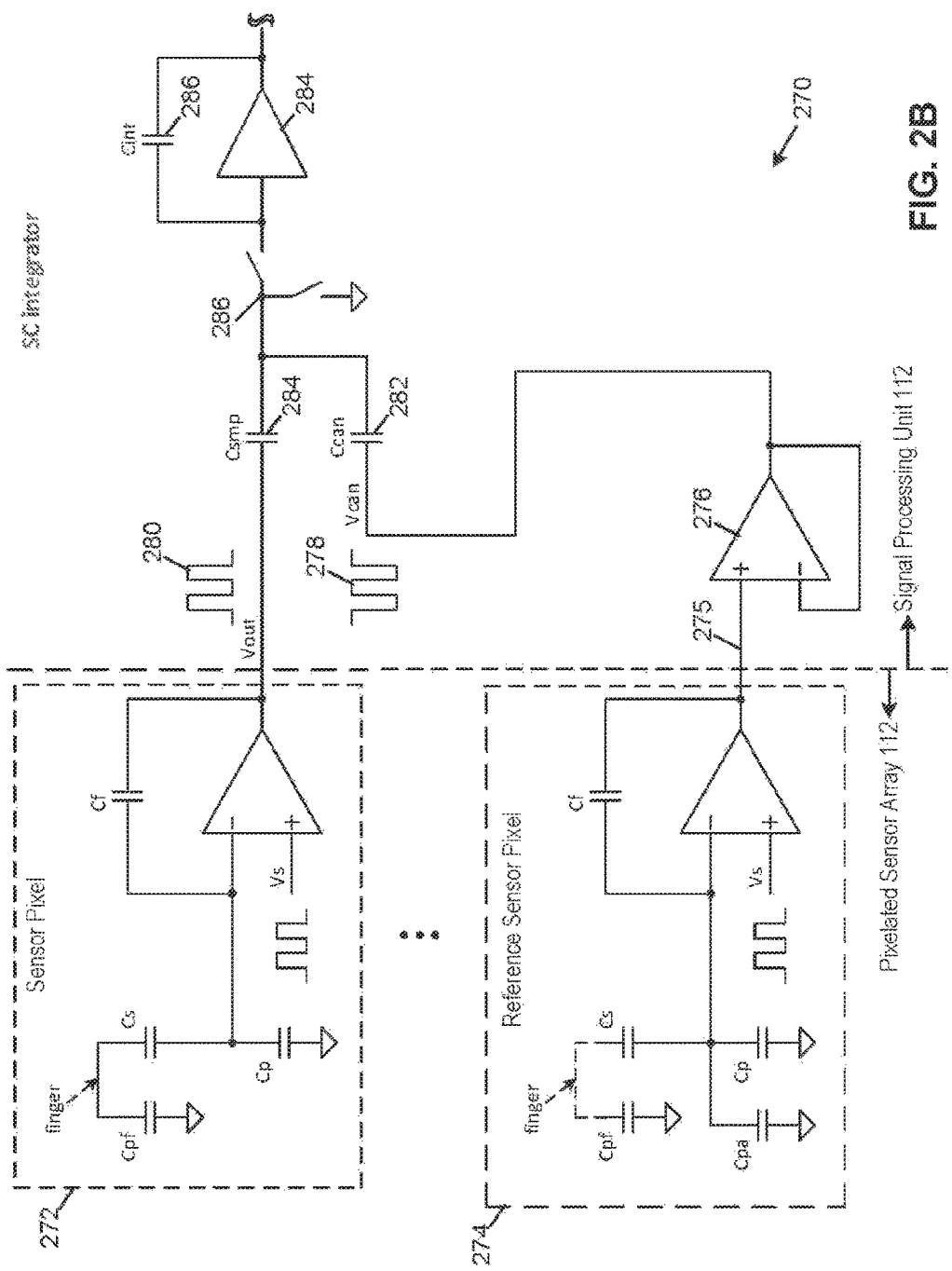
FIG. 2B is a schematic diagram showing a circuit equivalent of another exemplary sensor chip implementing active baseline signal cancellation.

FIG. 2B is a schematic diagram showing a circuit equivalent of another exemplary sensor chip 270 implementing active baseline signal cancellation. The sensor chip 270 is substantially similar to the sensor chip 200 shown in FIG. 2A. However, sensor chip 270 shows an implementation where self-capacitive sensor pixels are included in the array 110 of sensor pixels to illustrate an exemplary implementation using a specific sensor pixel type. Similar to the sensor chip 200 and 102, the sensor chip 270 includes a number of sensor pixels as represented by the use of " . . . " label between sensor pixels.

In the example shown in FIG. 2B, one sensor pixel 272 is shown to generate an output signal 280 that includes ridge/ valley signals contributing to the fingerprint data. One sensor pixel 274 is selected as the reference sensor pixel for generating a reference output signal 275. Similar to the sensor chip 200, the signal processing unit 114 includes circuitry for generating the baseline cancelation signal 278, processing the output signals (e.g., output signals 280 and 278) from individual sensor pixels (e.g., 272) including the reference sensor pixel 274 to cancel the baseline signal from sensor pixel output signals. As described with respect to FIG. 2A, the baseline canceling signal 278 can be used as a consistent reference signal to subtract from or add to the output signal(s) 280 based on the inverting or non-inverting configuration of amplifier 276.

Along the signal paths of output signal 280 and baseline cancelling signal 278, corresponding load (e.g., capacitive loads) Csmp and Ccan are disposed to enable voltage addition, voltage subtraction, voltage division, etc. used to remove the baseline cancelling signal 278 from the output signal 280. In addition, a switch network 286 can be used to control operation of the integrating amplifier 284. The gain of the amplifier 284 can be controlled by controlling the capacitance of the feedback capacitor 286.

Figure 3:
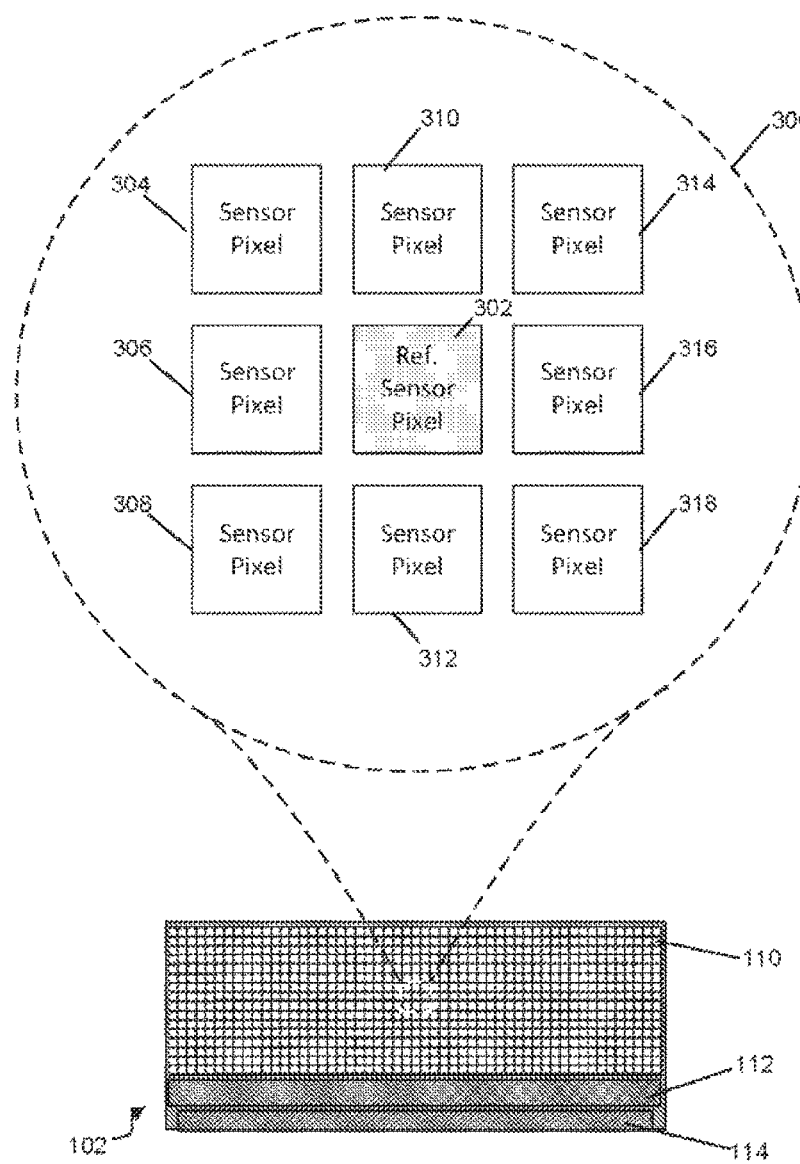
FIG. 3 is a diagram showing an exemplary reference sensor pixel used for active baseline signal cancelation.

FIG. 3 is a diagram showing an exemplary reference sensor pixel used for active baseline signal cancelation. As described above with respect to FIGS. 1A and 1B, the sensor chip 102 includes an array 110 of sensor pixels, a signal processing unit 112 for processing signals received from all of the sensor pixels in the pixelated sensor array 110, and a connection unit 114 electrically coupled to the signal processing unit 112. The signal processing unit 112 can include various signal processing components including amplifiers, filters, and an analog to digital converter (ADC). The connection unit 114 can include multiple electrodes which can be connected to external circuitry through wire-bonding, bump bonding or other connection means. The connection unit 114 can be disposed along an edge of the sensor chip 102 for the convenience of interfacing with other components of the fingerprint sensor device 100.

A subset 300 of the array 110 of sensor pixels is magnified to illustrate selection of an exemplary reference sensor pixel. As described above with respect to FIGS. 1A and 1B, one or more sensor pixels can be selected as the reference sensor pixel. In addition, the selected sensor pixel(s) is chosen from near the center of the pixel array 110 to ensure direct contact with the finger 101 to obtain accurate baseline signal information. In the subset 300 of the array 110, the central sensor pixel has been selected as the reference sensor pixel 302, and the surrounding sensor pixels 304, 306, 308, 310, 312, 314, 316 and 318 are used to sense or detect ridge/valley signals that contribute to the fingerprint data In some implementations, rather than selecting one of the senor pixels as the reference sensor pixel, an adoptive baseline cancellation signal can be used to cancel out the baseline signal from each sensor pixel output signal. For example, the configurable baseline cancellation signal can be initially preset to a start value (e.g., a known average baseline signal in a fingerprint sensor device). After the initial scan of the finger, the preset value can be adjusted based on the sensed or detected signal of the sensor pixels. The percentage of the baseline signal in the output signals of the sensor pixels can be estimated to be 99% and so the preset value of the baseline cancellation signal can be adjusted to be close to 99% of the total output signal from individual sensor pixels. In some implementations, an average of all output signals from all sensor pixels can be used to adjust the baseline cancellation signal after the initial scan.

Figure 4A:
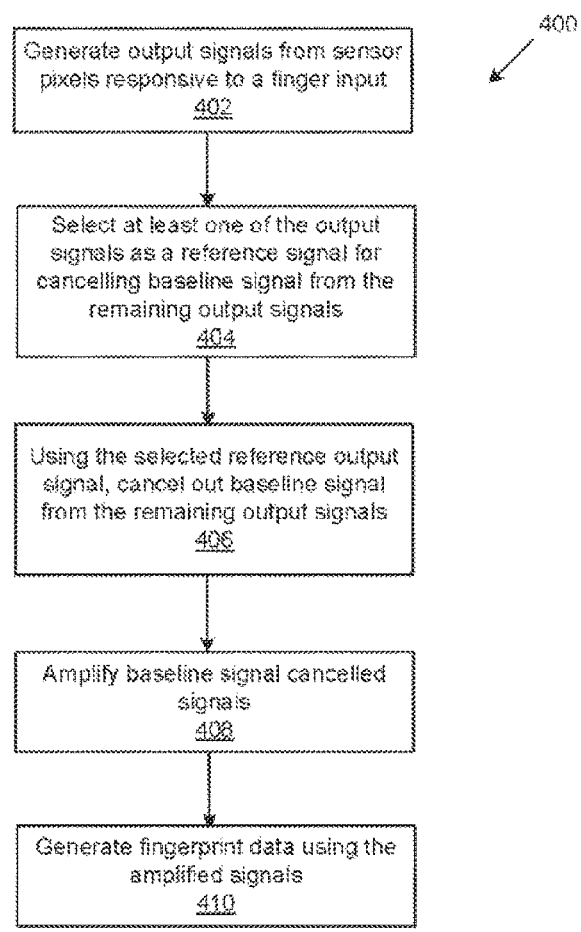
FIG. 4A is a process flow diagram of an exemplary process for active baseline signal cancellation.

FIG. 4A is a process flow diagram of an exemplary process 400 for active baseline signal cancellation. Responsive to a finger input (e.g., a finger contacting the fingerprint sensor device), array of sensor pixels generates corresponding output signals (402). The output signals are dominated by baseline signals with less than 10% attributed to ridge/valley signals that contribute to fingerprint data. At least one of the sensor pixels is selected as a reference sensor pixel. The output signal of the selected reference sensor pixel is selected as a reference signal for cancelling the baseline signals from the remaining output signals (404). The selected reference signal is used to cancel out the baseline signals from the remaining output signals (406). The resultant signals with the baseline signals cancelled out are amplified (e.g., using integrating amplifiers) (408) to readout the row of sensor pixel data and generate the fingerprint data (410).

Figure 4B:
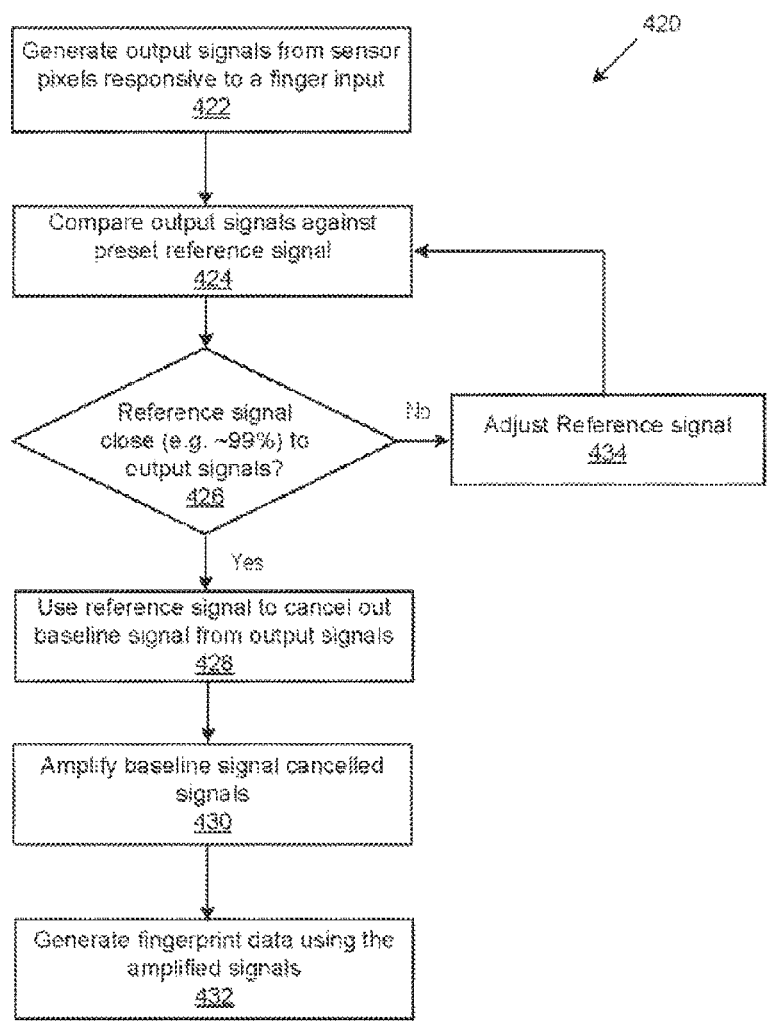
FIG. 4B is a process flow diagram of another exemplary process for active baseline signal cancelation.

FIG. 4B is a process flow diagram of another exemplary process 420 for active baseline signal cancelation. The process 420 uses adoptive preset reference signal to perform active baseline signal cancellation. Responsive to a finger input (e.g., a finger contacting the fingerprint sensor device), array of sensor pixels generates corresponding output signals (422). The output signals are dominated by baseline signals with less than 10% attributed to ridge/valley signals that contribute to fingerprint data. The output signals are compared against preset reference signal (424). When determined that the preset reference signal is close (e.g., within a threshold percentage, such as 99% of output signal) to the output signals (426), the preset reference signal is used to cancel out the baseline signals from the output signals (428). The resultant signals with the baseline signals cancelled out are amplified (e.g., using integrating amplifiers) (430) to readout the row of sensor pixel data and generate the fingerprint data (432). When the preset reference signal does not satisfy the threshold percentage, the preset reference signal is adoptively adjusted (434) and compared against the output signals of the sensor pixels (424). The preset reference signal is incrementally adjusted each time until the threshold is satisfied.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A fingerprint sensor chip, comprising:
an array of senor pixels, wherein at least one of the sensor pixels is designated as a reference sensor pixel and remaining sensor pixels in the array are designated to contribute to fingerprint data; the reference sensor pixel includes same fingerprint sensor components as the remaining sensor pixels; each sensor of the array of sensor pixels generates an output signal including a baseline signal and a fingerprint signal, wherein a magnitude proportion of the baseline signal in the output signal is greater than that of the fingerprint signal in the output signal; the output signal of the reference sensor pixel is used to generate a baseline cancellation signal; and
a signal processing unit including circuitry configured to cancel out baseline signals from output signals of remaining sensor pixels based on the baseline cancellation signal.

2. The fingerprint sensor chip of claim 1, wherein:
the circuitry to cancel out baseline signals is configured to cancel out the output signal of the reference sensor pixel from the output signals corresponding to the remaining sensor signals.

3. The fingerprint sensor chip of claim 2, wherein:
the signal processing unit includes an integrating amplifier for each of the remaining sensor pixels configured to amplify the baseline signal cancelled output signal of a corresponding remaining sensor pixel.

4. The fingerprint sensor chip of claim 1, wherein:
the signal processing unit includes a reference coupling capacitor for each of the remaining sensor pixels disposed on an electrical path to receive the output signal of the reference sensor pixel.

5. The fingerprint sensor chip of claim 1, wherein:
the signal processing unit includes a sensor coupling capacitor for each of the remaining sensor pixels disposed on an electrical path to receive the output signal of a corresponding sensor pixel.

6. The fingerprint sensor chip of claim 1, wherein:
the reference sensor pixel is positioned substantially near a center of the array of sensor pixels.

7. A method of cancelling a baseline signal in a fingerprint sensor chip, comprising:
responsive to an input indicating a fingerprint scan, generating, at an array of fingerprint sensor pixels, output signals including baseline signals and fingerprint signals, wherein a magnitude proportion of the baseline signals in the output signals are greater than that of the fingerprint signals in the output signals;
selecting one of the fingerprint sensor pixels as a reference fingerprint sensor pixel;
using the output signal corresponding to the selected reference fingerprint sensor pixel to generate a baseline cancellation signal;
cancelling out the baseline signals from remaining output signals corresponding to remaining sensor pixels based on the baseline cancellation signal; wherein the reference sensor pixel includes same fingerprint sensor components as the remaining sensor pixels;
amplifying the baseline signal cancelled output signals corresponding to the remaining sensor pixels; and
using the amplified signals to generate fingerprint data.

8. The method of claim 7, comprising:
selecting additional ones of the sensor pixels as reference sensor pixel; and
using the output signals corresponding to the selected reference sensor pixels to cancel the baseline signals from the output signals of the remaining sensor pixels.

9. The method of claim 7, wherein using the output signals corresponding to the selected reference sensor pixels includes:
averaging the output signals corresponding to the selected reference sensor pixels; and
cancelling out the baseline signals from remaining output signals corresponding to remaining sensor pixels based on the baseline cancellation signal includes:
using the averaged output signal to cancel the baseline signals from the output signals of the remaining sensor pixels.

10. A method of cancelling a baseline signal in a fingerprint sensor chip, comprising:
responsive to an input indicating a fingerprint scan, generating, at an array of fingerprint sensor pixels, output signals including baseline signals and fingerprint signals, wherein a magnitude proportion of the baseline signals in the output signals are greater than that of the fingerprint signals in the output signals;
comparing the output signals with a preset reference signal;
when the preset reference signal satisfy a threshold percentage of the output signals, cancelling out the baseline signals from the output signals by performing the following:
using the preset reference signal to cancel out the baseline signals from the output signals generated at the array of sensor pixels;
amplifying the baseline signal cancelled output signals corresponding to the array of sensor pixels; and
using the amplified signals to generate fingerprint data.

11. The method of claim 10, wherein the using the amplified signals to generate the fingerprint data includes reading out the amplified signals from the array of sensor pixels each row or column of the array of sensor pixels at a time.

12. The method of claim 10, when the preset reference signal does not satisfy the threshold percentage of the output signals, the preset reference signal is adjusted and compared against the output signals of the sensor pixels to determine whether the adjusted reference signal satisfies the threshold percentage.

13. The method of claim 12, when the adjusted reference signal satisfies the threshold percentage of the output signals, cancelling out the baseline signals from the output signals by performing the following:
using the adjusted reference signal to cancel out the baseline signals from the output signals generated at the array of sensor pixels;
amplifying the baseline signal cancelled output signals corresponding to the array of sensor pixels; and
using the amplified signals to generate fingerprint data.

14. The method of claim 12, including incrementally adjusting the adjusted reference signal until the threshold percentage is satisfied.

15. A mobile device comprising:
a fingerprint sensor device; and a protective cover disposed over the fingerprint sensor device, the protective cover including a dielectric material;
wherein the fingerprint sensor device includes a sensor chip, the sensor chip including: an array of senor pixels, wherein one of the sensor pixels is designated as a reference sensor pixel and remaining sensor pixels in the array are designated to contribute to fingerprint data; the reference sensor pixel includes same fingerprint sensor components as the remaining sensor pixels; each sensor of the array of sensor pixels generates an output signal including a baseline signal and a fingerprint signal, wherein a magnitude proportion of the baseline signal in the output signal is greater than that of the fingerprint signal in the output signal; the output signal of the reference sensor pixel is used to generate a baseline cancellation signal; and a signal processing unit including circuitry configured to cancel out baseline signals from output signals of remaining sensor pixels based on the baseline cancellation signal.

16. The mobile device of claim 15, wherein:

the circuitry to cancel out baseline signals is configured to cancel out the output signal of the reference sensor pixel from the output signals corresponding to the remaining sensor signals.

17. The mobile device of claim 16, wherein:

the signal processing unit includes an integrating amplifier for each of the remaining sensor pixels configured to amplify the baseline signal cancelled output signal of a corresponding remaining sensor pixel.

18. The mobile device of claim 15, wherein:

the signal processing unit includes a reference coupling capacitor for each of the remaining sensor pixels disposed on an electrical path to receive the output signal of the reference sensor pixel.

19. The mobile device of claim 15, wherein:

the signal processing unit includes a sensor coupling capacitor for each of the remaining sensor pixels disposed on an electrical path to receive the output signal of a corresponding sensor pixel.

20. The mobile device of claim 15, wherein:

the reference sensor pixel is positioned substantially near a center of the array of sensor pixels.

* * * * *